Nov. 23, 1971   J. H. KELLY   3,621,744
CABLE CUTTER
Filed June 4, 1970
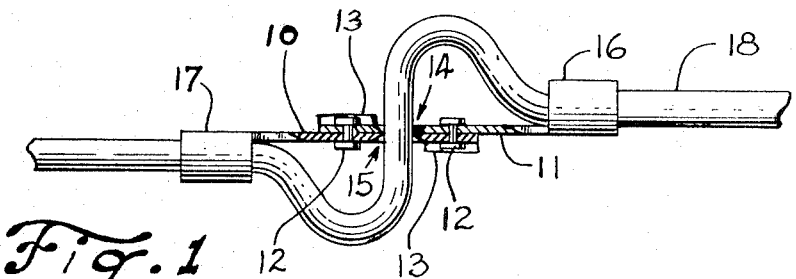
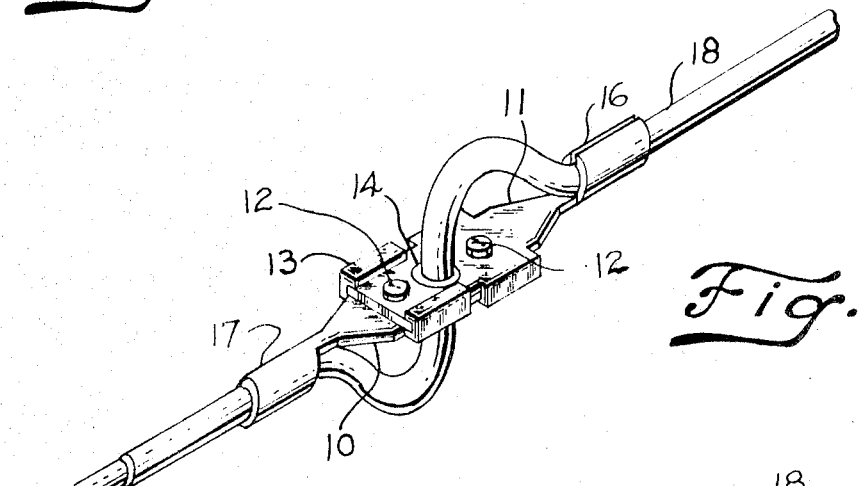
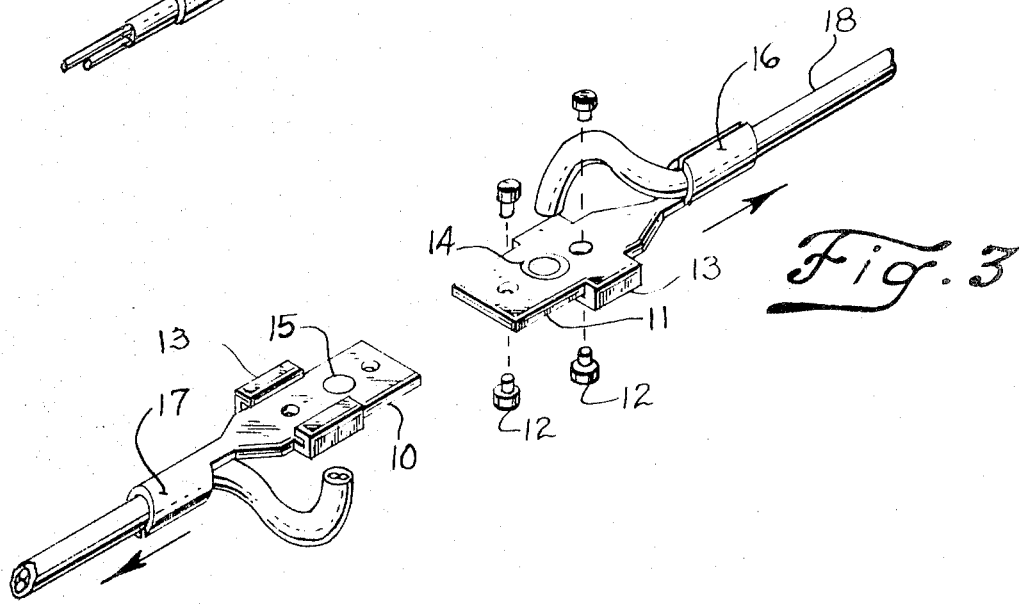
John H. Kelly INVENTOR.
BY
AGENT 3,621,744
CABLE CUTTER
John H. Kelly, Hartselle, Ala., assignor to Thiokol
Chemical Corporation, Bristol, Pa.
Filed June 4, 1970, Ser. No. 43,332
Int. Cl. B23d 15/00
U.S. Cl. 83—198                    5 Claims

ABSTRACT OF THE DISCLOSURE

An electric cable or a rope passes loosely through aligned sharp-edged holes in each of two plates adapted to slide over one another but fastened together with rivets. The cable is fastened securely to each of the two plates. As overload tension is applied to the cable, the two plates are pulled apart in opposite direction in a sliding manner as the rivets are sheared and the cable is cut by the sharp edges of the holes as they move out of alignment.

---

The present invention relates to a device for severing an electrical cable which is attached to a missile about to be launched and which it is desired be completely and automatically detached by severing when the vehicle is launched. It also applies to such a device which assures positive severing of the cable at a particular, predetermined location along the cable.

During the preparation of a rocket powered missile or space vehicle numerous electrical connections are made to ground installations in order to carry out the many important tests and functions necessary to a successful launch and mission. Electrical power is supplied to the missile and many wires and cables are needed as well for connecting communications equipment to the ground. While provision is made to disconnect all of these during the preparatory and count down sequences prior to the launch, the possibility remains that a cable may for some reason remain attached when it should have been removed. If this should occur, serious damage could result in that the cable might pull out parts of the vehicles' systems before it fails or its loose ends might cause a dangerous fire or explosion since the location of the failure would be unpredictable and the end of the cable could be electrically live. Also the ends of the cable would be likely to flail about and cause damage and be a danger to personnel if the severance was allowed to occur at random in the cable.

The present invention provides a simple but effective cable cutter which will automatically cut a cable when the cable is subjected to tensile over-loads and will sever it before the cable fails at some other point in its length. Also, the present invention provides a cutter of simple and "fool proof" arrangement but which provides very positive action without the need for explosives, springs or the like and depends instead solely on the increase in tensile load to initiate its action thus eliminating the possibility of failure of the ignition means for the explosive or even human error in not pressing the "destruct" button nor releasing the spring at the appropriate time.

While the present invention is particularly useful in the application described above, it is apparent that it will also be useful in cutting cables used with machines or other vehicles such as automobiles which may be subject to movement before the cable is disconnected in the usual way. For example, an electric automobile or lift truck having its batteries charged would be connected by an electrical cable to a charger, and, if the vehicle was driven off without detachment of the cable, damage to the equipment and possible danger to persons could be prevented by the use of the cable cutter comprising the present invention.

It is, therefore, an object of the present invention to provide a cutter for a cable which will sever the cable in a positive manner and at a particular location when an overload of tension is put upon the cable.

It is also an object of the present invention to provide a cutter of the foregoing type in which the tensile overload at which cutting occurs is determined by the shearing strength of the rivets holding the halves of the connector together.

It is also an object of the present invention to provide a cable cutter of the foregoing type which is automatic and positive in action yet is simple and inexpensive to construct, manufacture and install.

Other objects and advantages will be apparent from the description and claims which follow:

In the drawings:

FIG. 1 is a front elevation in partial cross section showing the cable and the shear members in place;

FIG. 2 is a perspective view showing the assembled cutter with the cable and rivets in place;

FIG. 3 is a perspective view after the rivets have been sheared and the cable severed.

A preferred embodiment of the present invention is shown in FIGS. 1, 2 and 3 wherein plates 10 and 11 are arranged in overlapping relationship to one another, fastened together by means of shearable rivets 12, and are restrained from all motion except longitudinal sliding by guides 13. In both of plates 10, 11 is a through aperture 14, 15 of slightly larger diameter than the cable to be severed and each aperture having a sharpened edge in juxtaposition to the other and with the apertures in alignment with one another. Plates 10, 11 each have a cable retainer for ferrule 16, 17 as shown to clamp the cable 18 securelyl to each of plates 10, 11. As shown in the drawings, the cable 18 is passed through one of the ferrules, for instance ferrule 16, after which it is looped upward rather loosely and then is passed down through aligned apertures 14, 15 after which is looped downward and then passed through ferrule 17. The cable 18 is allowed to remain in the loosely looped condition and is then clamped securely to each of plates 10, 11 by a crimping action applied to ferrules 16, 17 so that they will grip the cable 18 tightly. The looseness of the looped cable is intended to be sufficient to allow the plates 10, 11 to slide sufficiently to close the opening defined by apertures 14, 15 without stretching or yielding of the cable between the ferrules 16, 17.

The rivets 12 can be of different sizes and materials in order that they will fail at the desired tensile load. This load, however, is always less than the breaking strength of the cable 18 so that the cable will be parted only at the cutter where its loose ends can be contained or otherwise kept away from its surroundings to prevent unintentional grounding or short circuiting of the cable 18 or lashing about of the severed cable ends.

In operation, tensile loads exerted on cable 18 will be transmitted to plates 10, 11 through ferrules 16, 17 and will normally be resisted by rivets 12. If, however, the tensile loads become abnormally great, rivets 12 will fail in shear thus allowing plates 10, 11 to be pulled across one another until they separate entirely as shown in FIG. 3. As plates 10, 11 start to move relative to one another apertures 14, 15 no longer remain in alignment and the opening defined by them continually reduces in area until it becomes completely closed. As this is occurring, the sharp edges of apertures 14, 15 cut into the cable 18 from opposite sides of the cable and pass through it until it has been severed.

While there have been shown and described and pointed out the fundamental novel features of the invention as applied to a preferred embodiment, it will be understood that various omissions and substitutions and changes in the form and details of the device illustrated and in its operation may be made by those skilled in the art without departing from the spirit of the invention. It is the intention, therefore, to be limited only by the scope of the following claims.

What is claimed is:

1. A cable cutter for severing a cable subjected to tension overloads comprising first and second overlapping plates, an aperture in the first plate in sufficient alignment with the aperture in the second plate to accept a cable, a sharp edge on each aperture, fasteners holding the plates together and adapted to fail at a load less than that of the failure strength of the cable, guide means for each plate to insure sliding motion only, a cable retainer on each plate and a continuous cable which passes through the apertures and is clamped by each of the cable retainers, whereby a tension overload on the cable causes the fasteners to separate, the first and second plates to be pulled in a sliding manner over one another until free of their lateral retention guides and the apertures to close with a cutting action to sever the cable.

2. The invention set forth in claim 1 with the fasteners comprising shearable rivets sized to fail at less than the breaking strength of the cable.

3. The invention set forth in claim 1 with the sharp edge of each aperture in juxtaposition to that of the aperture whereby the cutting action as the plates are pulled over one another is as nearly in one plane as possible.

4. The invention set forth in claim 1 with the cable retainers comprising ferrules into which the cable is crimped.

5. The invention set forth in claim 1 with the guide means comprising plate extensions overlapping the adjacent plate and having grooves disposed longitudinally of the plates and in which the plates are adapted to slide until the cutting action is completed.

References Cited
UNITED STATES PATENTS

| | | | |
|---|---|---|---|
| 1,913,813 | 6/1933 | Mirick | 83—198 X |
| 2,363,097 | 11/1944 | Sutter | 83—198 |

JAMES M. MEISTER, Primary Examiner

U.S. Cl. X.R.

83—370, 580, 701